(12) United States Patent
Gaur et al.

(10) Patent No.: US 6,719,956 B1
(45) Date of Patent: Apr. 13, 2004

(54) CARBON ALLOY PRODUCTS AND A PROCESS FOR THEIR PRODUCTION

(76) Inventors: Siddhartha Gaur, VSLR Sciences, 3800 Lowrey Way, Plano, TX (US) 75025; Vibha Bansal, VSLR Sciences, 3800 Lowrey Way, Plano, TX (US) 75025

( * ) Notice: Subject to any disclaimer, the term of this patent is extended or adjusted under 35 U.S.C. 154(b) by 71 days.

(21) Appl. No.: 09/663,115

(22) Filed: Sep. 15, 2000

(51) Int. Cl.$^7$ .............................................. C01B 31/02
(52) U.S. Cl. .................................. 423/445 R; 264/29.3
(58) Field of Search .................... 423/445 R; 264/29.1, 264/29.3

(56) References Cited

U.S. PATENT DOCUMENTS

| | | | |
|---|---|---|---|
| 4,101,354 A | 7/1978 | Shaffer | 156/60 |
| 4,152,119 A | 5/1979 | Schulz | 44/1 D |
| 4,183,731 A | 1/1980 | Eisel | 44/10 |
| 4,187,079 A | 2/1980 | Weber et al. | 44/10 |
| 4,213,956 A * | 7/1980 | Ubbelohde | 423/448 |
| 4,234,386 A | 11/1980 | Stirling | 201/6 |
| 4,357,183 A | 11/1982 | Fan et al. | 148/181 |
| 4,369,042 A | 1/1983 | Schafer et al. | 44/15 |
| 4,412,841 A | 11/1983 | Du Broff et al. | 44/10 |
| 4,465,556 A | 8/1984 | Bowen et al. | 202/99 |
| 4,475,924 A | 10/1984 | Meyer | 44/51 |
| 4,477,257 A | 10/1984 | Koppelman et al. | 44/30 |
| 4,601,728 A | 7/1986 | Dungs et al. | 44/10 |
| 4,661,119 A | 4/1987 | Andersson et al. | 44/10 |
| 4,908,167 A | 3/1990 | Beckmann et al. | 264/29 |
| 5,076,297 A | 12/1991 | Farrier et al. | 131/369 |
| 5,125,931 A | 6/1992 | Schulz | 44/552 |
| 5,264,007 A | 11/1993 | Lask | 44/564 |
| 5,542,962 A | 8/1996 | Ollerenshaw et al. | 71/10 |
| 5,752,993 A | 5/1998 | Eatough et al. | 44/553 |
| 5,807,420 A | 9/1998 | Eatough et al. | 75/10.61 |
| 5,912,403 A | 6/1999 | Bilke | 75/773 |
| 5,916,826 A | 6/1999 | White | 44/551 |
| 5,955,375 A * | 9/1999 | Zondlo et al. | 423/448 |

OTHER PUBLICATIONS

"Carbon Alloys. Novel Concepts to Develop Carbon Science and Technology" by E. Yasuda, M. Inagaki, K. Kaneko, M. Endo, A. Oya and Y Tanabe, published Apr., 2003.

"Thermal Data for Natural and Synthetic Fuels" by Siddhartha Gaur and Thomas B. Reed, published in 1998.

"1999 Annual Book of ASTM Standards" Section 5, Petroleum Products, Lubricants, and Fossil Fuels, vol. 05.05 Gaseous Fuels; Coal and Coke, pp. 310 and 311.

"Coal Preparation", editor Joseph W. Leonard, III, associate editor Byron C. Hardinge, Fifth Edition, Published by Society for Mining, Metallurgy, and Exploration, Inc., Littleton, Colorado 1991, pp. 547 and 548.

"Chemistry" by Raymond Chang, Copyright 1981 by Random House, Inc., pp. 258 and 259.

"P–075U Optimization of Mechanical Properties of Thermoplastics Through Alloying" by Larry Wang pp. 1 through 7.

"Polymer Development Through Blending and Alloying" Search–In–Print 2002, ISBN: 0–88387–178–5.

"High Temperature Alloy Design—High Temperature Alloy Design and Theory & Design of Monolithic nad Dual Phase Alloys Based on Laves Phases".

"Mechanical Alloying".

"Production of Thermoelectric Materials by Mechanical Alloying—Extrusion Process", 5N Plus Inc., Saint–Laurent (Quebec), Canada; Ecole Polytecnique de Montreal, Montreal (Quebec), Canada.

35 Cryogenic Mechanical Alloying of Poly (ether ether ketone) Polycarbonate Composite Powders for Selective Laser Sintering.

"Alloying Global and Local Branch History: Taxonomy, Performance, and Analysis" by K.Skadron, M. Martonosi, and D.W. Clark, Tech Report TR–594–99, Princeton Dept. of Computer Science, Jan. 1999.

"Interaction between carbon/nitrogen and substitutional alloying elements" by Hiroshi Numakura, Computer–assisted microstructure control of steels equilibrium and kinetic aspects, Iron and Steel Institute of Japan, 2000 no month.

* cited by examiner

*Primary Examiner*—Stuart L. Hendrickson
(74) *Attorney, Agent, or Firm*—John W. Montgomery; Haynes & Boone, LLP.

(57) ABSTRACT

A carbonaceous material and a process of making the carbonaceous material is provided. A particulate of partially pyrolyzed carbon (PPC) base is formed on heating a carbon-containing feed material and a nucleating agent in the form of a interactive filler is included. The nucleating agent is adhered together to the PPC particles by application of heat.

1 Claim, 13 Drawing Sheets

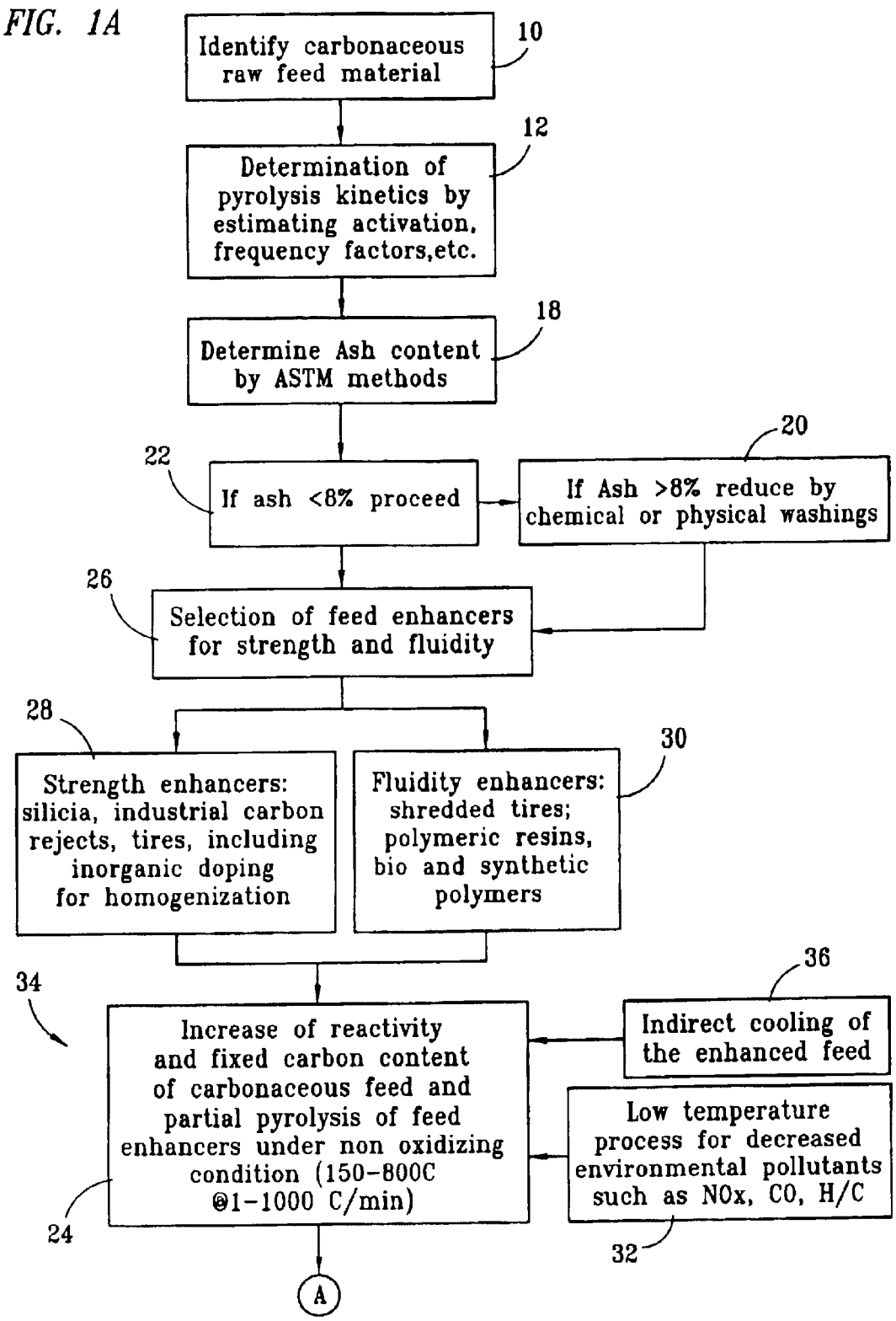

Effect of Heating Rate
(Heated at 1, 4, 10, 40 and 100 °C/min)

Effect of Heating Rate

FIG. 11  PVA (16.8), Polyethylene (11.2%), PTFE (19.9%), PVC (32.4%) & PMMA (19.7%)

CARBON ALLOY PRODUCTS AND A PROCESS FOR THEIR PRODUCTION

TECHNICAL FIELD OF THE INVENTION

Field of the Invention

The Invention is directed to the production of carbonaceous materials, particularly to a product formed from a base carbonaceous feed material (virgin or refuse) and a blend of materials that form feed modifiers, and to its method of manufacture.

DESCRIPTION OF THE INVENTION BACKGROUND

Background of the Invention

It is well known in the metallurgical arts to use coke and other carbon-based fuels as reductants, energy sources, reactive agents, and fillers in industrial processes: for example, the smelting of ores. Typically, the formation process for these fuels and carbon sources begins with a virgin metallurgical coal, such as bituminous coal, that is then heated by conduction methods for long hours (20 or more) at high temperatures of 2200° F. or higher.

SUMMARY OF THE INVENTION

A carbonaceous material and a process of making the carbonaceous material is provided. A particulate of partially pyrolyzed carbon (PPC) base is formed on heating a carbon-containing feed material and a nucleating agent in the form of a interactive filler is included. The nucleating agent is adhered together to the PPC particles by application of heat.

BRIEF DESCRIPTION OF THE DRAWINGS

The characteristics and advantages of the present Invention may be better understood in reference to the accompanying specification including the detail description, the claims and the following drawings, wherein like reference numerals designate like elements and in which:

DETAILED DESCRIPTION OF THE INVENTION

While the present Invention may be embodied in many different forms, for the ease of description, this detailed description and the accompanying drawings disclose only specific forms as examples of the Invention. Persons with ordinary skill in the relevant art will be able to adapt the Invention to apply to other forms not specifically presented herein, based upon this description.

Figure 1B:
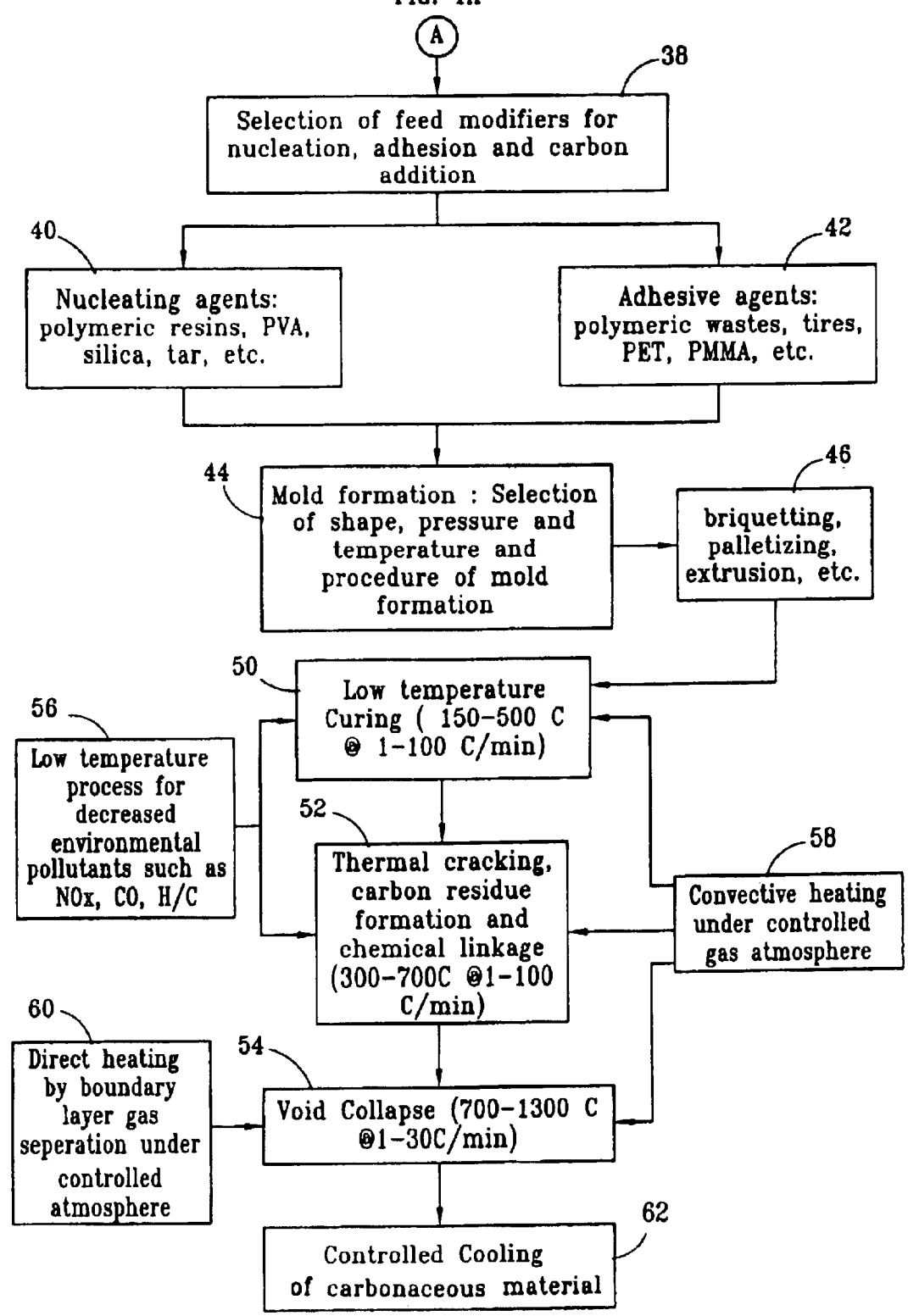
FIG. 1 (including FIG. 1A continuing on FIG. 1B) is a schematic diagram depicting the flow of steps in the process of the Invention.

As illustrated in FIG. 1, an embodiment of the multiple-stage process of the present Invention is directed to the production of carbonaceous material, that could substitute as fuel in various applications, including but not limited to foundry and blast, furnace applications, ceramic processing, Ferro and non-Ferro metal alloy production, and carbon fibers. An aspect of this invention relates to the production of carbonaceous materials having desired content or characteristics, sometimes referred to as "carbon alloys," and the process for making such carbonaceous materials, or "carbon alloys," that can substitute for conventional fuels like coal and coke, used in blast furnaces, as high-carbon fuels for non-Ferro metal alloy industries, as reductants for Ferro metal alloys, as reductants for cupolas, and as a source for carbon electrodes and carbon filters.

The multiple-stage process for the production of these carbonaceous materials is not dependent on the use of virgin metallurgical grade coal as feed material, as is used by prevailing processes. Instead, the process of the invention is directed towards enhancing the rank and quality of low cost and waste carbonaceous materials by forming carbonaceous materials where, each property of the carbonaceous material is tailor made based on the properties of its various feed materials. The Process may utilize, for example: refuse coal, coal tailings, steaming coal, agricultural residues, polymeric wastes, lignite and other coal types (presently considered unsuitable for production of coke and other such fuels) or other refuse carbonaceous materials. Preferred refuse materials are those that produce high fractions of fixed carbon during the successive steps of the process.

Pyrolysis Kinetics and Thermal Behavior

As detailed below and referring to FIG. 1, the multiple-stage process of the present Invention includes the selection, at 10, of starting material based on the property requirements of the final carbonaceous material. This selection is done by understanding or determining, at 12, the partial pyrolysis kinetics and its effects on changes in the physical and chemical structure of the carbon based feed material. An example of the partial pyrolysis kinetics is given in graphical form in FIG. 2, where rate of conversion of solid carbonaceous substance as a function of temperature at a given heating rate is illustrated by curve 14. The initiation temperature 16 and the slope of the curve 14 help in the understanding of the partial pyrolysis kinetic behavior.

Once the kinetics and thermal behavior of the feed material are understood, and their effects qualitatively and quantitatively established, the effects of inorganic ash are established, at 18 of FIG. 1. The ingredients in ash help characterize the reactive surface of the partially pyrolyzed carbon. The ash content has its own physical effects. If the ash content is as desired (as for example if below 8% ash is desired) then the process proceeds as at 22 of FIG. 1. If the ash content needs to be reduced or modified this can be done as at by techniques of physical doping and separation, chemical or physical wash, or combinations thereof as at 20.

Ash Reduction and Modification

For reasons of cost of reducing the ash content, starting feed materials with an ash content less than 23% are preferable. The multiple-stage process may yield acceptable products using feed materials of higher ash content (to 35–40%). For example, some carbonaceous refuse used for feed material may have high initial ash content, ranging from 15–30% by weight, then reduced by washing and other conventional processes. Ash content may be reduced by known techniques, including washing, cell flotation, and gravity separation, to no greater than 8%, but preferably 1–4%.

Alteration of Reactivity

Increasing the reactivity, increasing the surface area and increasing the internal void volume of ash-reduced low rank carbon material, and converting it to a partially-pyrolyzed carbon base is a step in the process, as at 24 of FIG. 1. During this step, the materials physically undergo particle agglomeration and are transformed to a sponge-like structure, with large presence of micropores. This results in a large increase in surface area and reactivity. Chemically, the hydrocarbon fraction undergoes severe reduction, and a portion of the hydrocarbon fraction undergoes thermal cracking. This results in the formation of carbon deposits, thereby increasing the fixed-carbon content of the feed material.

Enhancement of Strength and Fluidity

Another step that might be concurrent to the adjustment of the reactivity step, comprises enhancing the strength and/or enhancing the fluidity of the carbon base, as at 26, 28, and 30 of FIG. 1. It has been found that materials like refuse carbon sources, steaming coals, agricultural resides, polymeric wastes, lignite and the like materials have low strength and could lead to the formation of fragile structures. The strength of these fragile carbon materials is increased by reinforcing the structure with the addition of inorganics like silica and organics like coke breeze. The homogeneous dispersion in small but measured proportions of these selected materials, as at 28 in FIG. 1, helps in the reinforcement of structural strength of the carbon base. The selection of reinforcement agents, as at 26, is dependent on the desired characteristics of the carbonaceous material to be produced so that it will perform well in the final application of the carbonaceous material product. In addition to the addition and dispersion of structural reinforcement agents, biopolymers such as molasses, tar, pitch, and synthetic polymers as vinyl acetates, alcohols are added, as at 30 in FIG. 1. These fluidity enhancers are advantageously added simultaneously with the strength enhancers. The addition, of these compounds allows for the increase in carbon base formation and increase in the fluidity of the carbonaceous material. Increase in fluidity facilitates allowing carbon particles of the carbonaceous material to coalesce.

Figure 3:
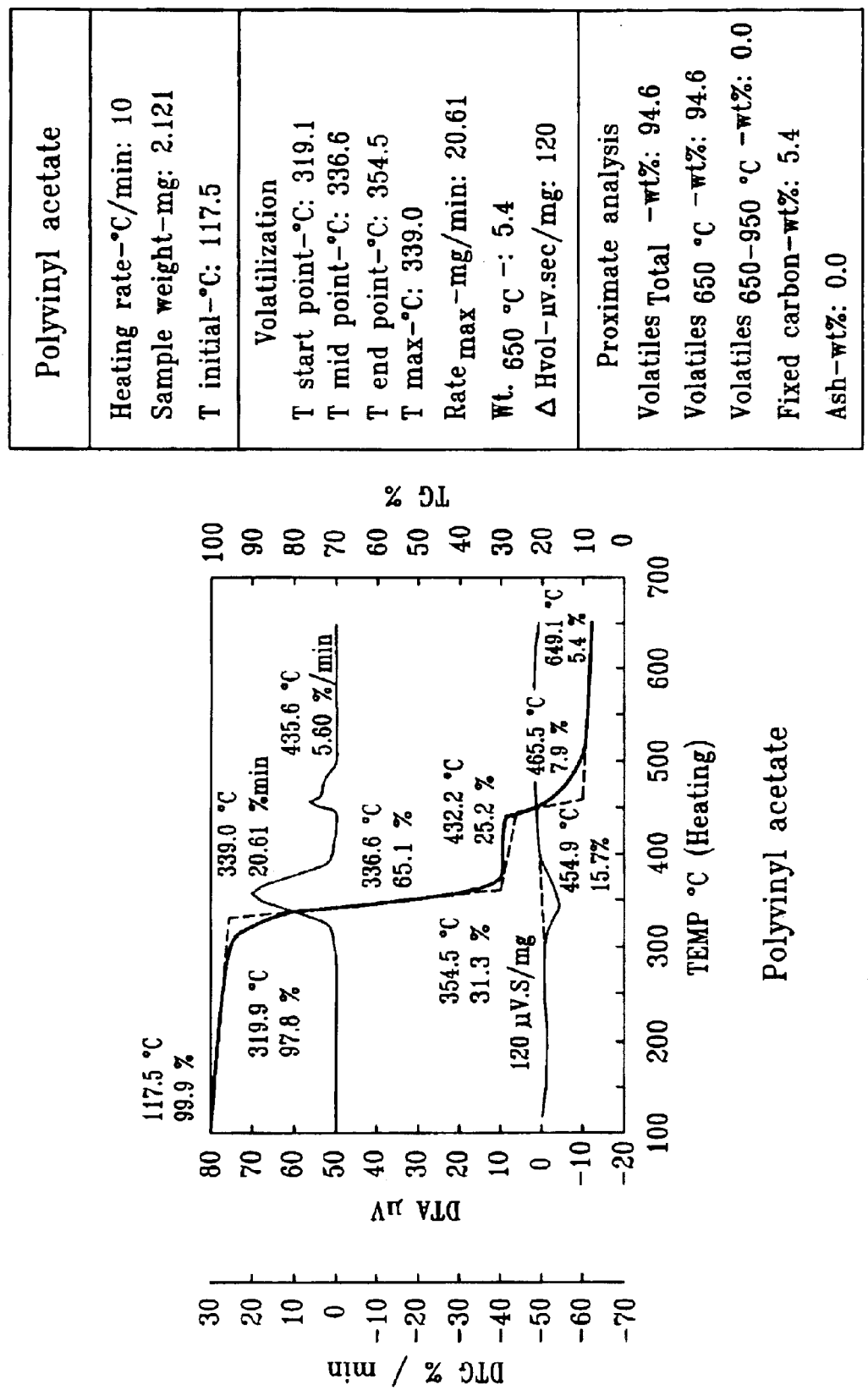
FIG. 3 shows an example thermogram for vinyl based compound (poly vinyl acetate) as another usable source of carbonaceous feed material selectable for its characteristics according to one aspect of the invention.

Vinyl based compounds are known to thermally decompose in multiple stages in a complex manner. The first stage of their degradation is similar to unzipping stage of the polymeric weak link. This leads to aromatization of the polymer and increase in the carbon to hydrogen ratio. The subsequent steps lead to carbon formation due to thermal cracking (FIG. 3). The thermal cracking leads to the formations of carbon deposits as a reactive filler in the porous and reactive carbon surface described earlier. The increased volatile content from these polymeric materials and their complex liberation procedure provides for the increased fluidity to the low rank, low strength, and structurally fragile carbon based materials. This combined process is termed as the enhancement step, referred to generally with reference number 34, for the feed carbon base according to the present invention.

This process is beneficially conducted in an inert environment within a low to moderate temperature range of 150–800° C., between the heating rates of 1° C./minute to 1000° C./minute, depending on the reactivity of the surface area requirement of the partially pyrolyzed carbon base. The necessary time, for which the material is retained at the heating temperature, also depends on the material and may vary from less than a few minutes to a few hours. For example, sub-bituminous Wyoming coal can be heated from 140–493° C. at 10° C./min heating rate, while North Dakota lignite can be heated from 236–469° C. at 10° C./min heating rate depending on the actual requirement of the reactivity. On the other hand, materials like Carbowax, added to increase the fluidity and carbon adhesion may be heated in the temperature range of 292–464° C. at 10° C./min. This would change for Teledyne based refuse derived fuel from 294–469° C. at 10° C./min. FIGS. 4 through 7 present the conversion curves for these selected materials under inert atmosphere at selected heated rates.

The change in temperature range and heating rate effects the reactivity and the surface area, and the agglomeration properties of the feed materials. The appropriate reactivity and temperature range is determined by the application of one of the following kinetic rate equations:

$$dX/dT = (A/a_i)(a_i/a_o)^m \exp(-E/RT_i)f(X)^n$$

$$dX/(1-X)^n = A/a \exp(-E/RT)dT$$

Figure 8:
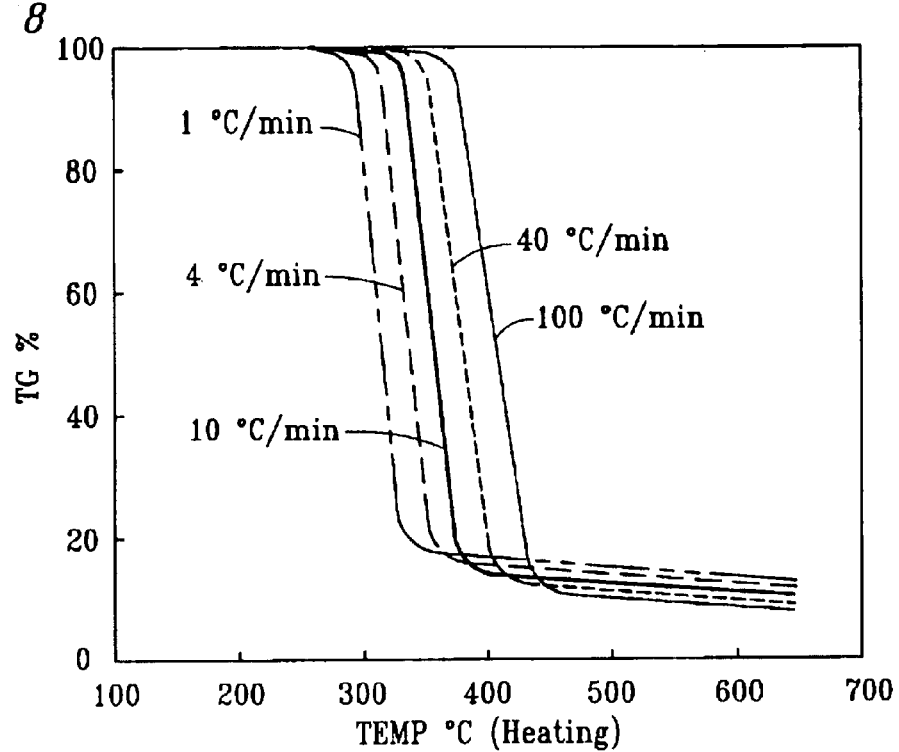
FIG. 8 shows an example of the effect of heating rate on the temperature for the reaction.
Figure 9:
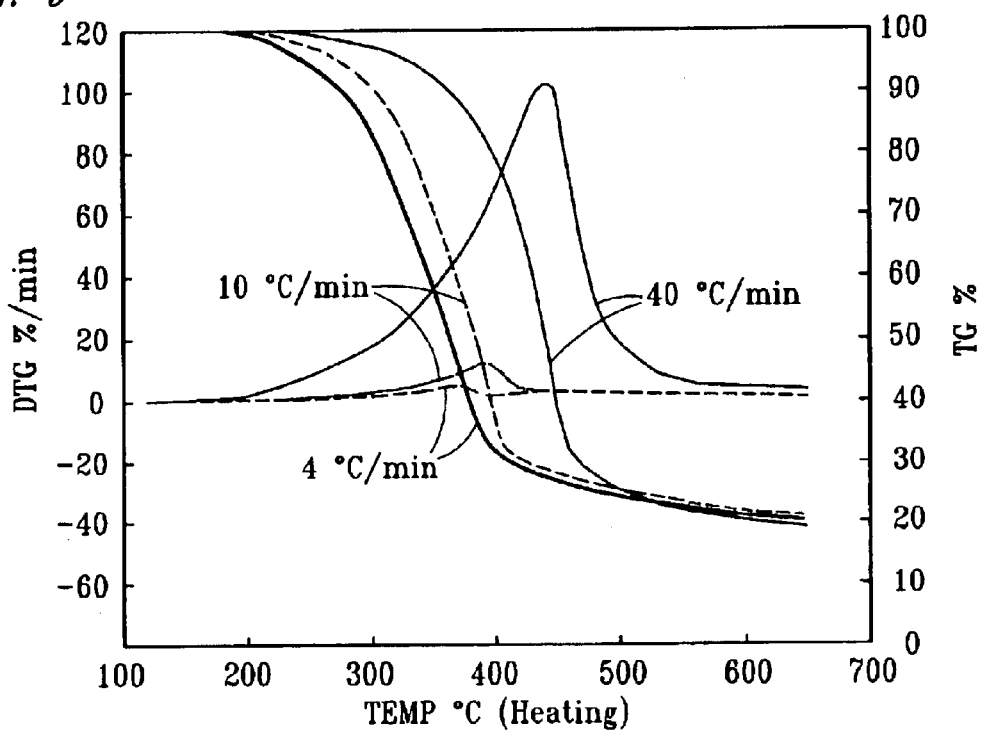
FIG. 9 shows an example of the effect of heat rate on the rate of devolatilization.
Figure 10:
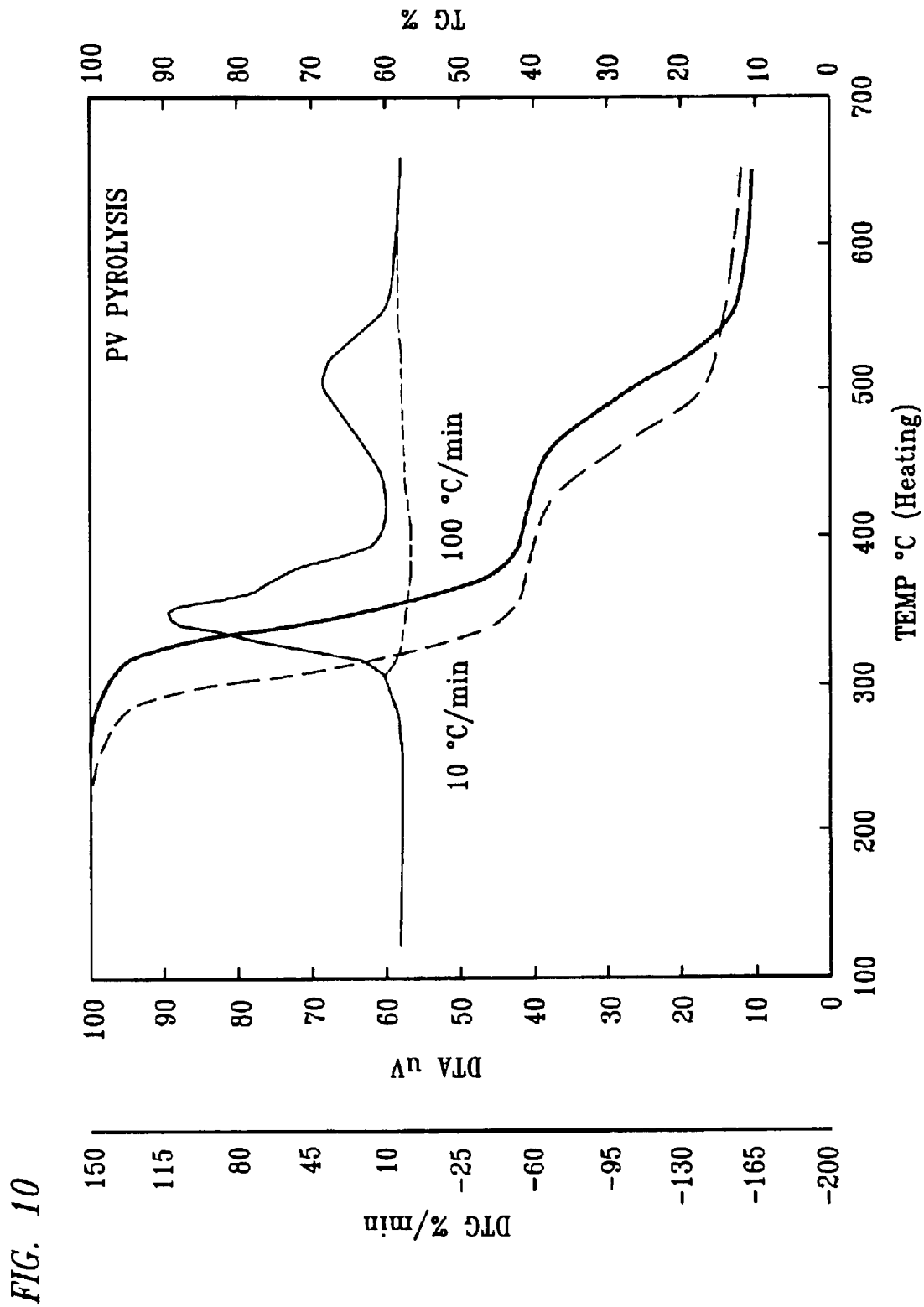
FIG. 10 shows an example of the effect of heating rate on carbon addition

Where: A=Pre exponential factor
E=Activation energy
ai=The applicable heating rate
ao=The heating rate at which the kinetics is known
R=The universal gas constant
T=Temperature
X=Conversion factor
n=Reaction order
m=Empirical exponent FIG. 8 shows the effect of heating rate on the temperature for the reaction. This change in temperature leads to change in the reactivity and the surface area of the carbon feed base and the feed enhancer added during the enhancement stage of this process. The reactivity of the carbon base increases with the increase in the heating rate and vice versa due to the effect of rate of devolatilization (FIG. 9). Hence, the selection of specific temperature, heating rate and the residence time and their combination is selected based on the needs of the reactivity, surface area, volatile content needed for the specific carbonaceous material to be produced and the chosen feed material for the manufacture of such carbonaceous material.

Decrease in Environmental Pollutants

In addition, evolution of chemical nitrogen and sulfur, and its binding with the inherent oxygen to form chemical and thermal NOx and SOx (the acid rain forming gases and listed EPA criteria pollutants), along with the formation of toxic components (like BTX and related chemicals) is the driving force in deciding the temperature for this primary step, and for deciding the rate and mode by which the heat is transferred to the carbon base particle.

The relatively low temperatures and residence times, at which this partial pyrolysis is conducted, as at 32 of FIG. 1, yields significantly less volumes of greenhouse gases due to reduced amount of fuel utilization, relative to volumes produced during high-temperature pyrolytic production techniques conventionally used to manufacture products like coke. In addition, since the formation of thermal nitrogen oxides (NOx, NO, NO2) is favored at temperatures greater than 700° C. combustion conditions, the formation NOx during this stage of the present invention is greatly reduced. Because NOx is an acid rain compound, reducing its generation is a significant advantage of the multiple-stage process of the present Invention.

The overall selection of feed materials (low sulfur), temperature ranges (less than 700° C. for majority of the process leads to reduced NOx formation), residence time (four to eight hours), the control of the atmosphere (reduced oxidant and CO2 environment) and the heating mechanism (indirect and convective heating over conductive) leads to dramatic reduction of pollutants from the process such as NOx, SOx, BTX and greenhouse gases like CO2, CO when compared with conventional methods of coke making in the industry. These reductions in environmental pollutants make this a clean process and provides for a safer and reduced greenhouse gas emissions.

Inorganic Addition and Homogenization

In producing inorganic doped-carbon base, the inorganic stream is added into the heated vessel. During the pyrolysis stage, liberation of hydrocarbons leaves void spaces for the inorganics to become encapsulated in the carbon matrix. Such encapsulation later helps to control application of heat to the inorganic base. Encapsulation aids in such processes as reduction, oxidation and chemical addition of the inorganic fraction. This process makes the inorganic treatment an in situ procedure. The design of the vessel, used to carry on the partial pyrolysis and/or inorganic doping process phenomenon, can be unique or common to some of the carbonaceous materials products. This process is termed the homogenization step of the feed carbon base, used to produce the requisite carbonaceous material.

The design of the vessel, used to carry on the feed enhancement step and/or the homogenization step inorganic doping process phenomenon, can be unique or common to some of the carbonaceous materials products.

Feed Modifiers

The selection of feed modifiers to the carbon base is shown at 38 in FIG. 1. the feed modifiers are used to provide necessary ingredients in producing the final carbonaceous material product. Feed modifiers provide several functions to the alloy properties: such as varying reactivity, varying the strength of the alloy, acting as a reactive and necessary doping agent, incorporating variations of their rate of consumption, offsetting the effects of the feed carbon base feed, etc.

The feed modifiers are interactive additions: they leave behind carbon residues to the feed carbon base, thus changing the basic morphology of the base material. They provide the nucleation site for the formation of the carbonaceous material, as at 40, and provide a node for the adhesion of various carbon mixes, as at 42, to form the desired carbonaceous material. The selection of these feed modifiers varies within a wide variety of synthetic and natural hydrocarbon-based materials, including virgin polymers (like vinyl acetates, alcohols methacrylates, tetra fluroethylenes, ethylenes, polymeric resins, etc.), refuse tires, recycled polymer wastes, agricultural residues (and their products like molasses, biomass tar fluids and pitch), coal tar and pitch, activated carbon bases (like coconut shell carbon), carbon residues from industrial wastes and recycle streams, and inorganic fractions from agricultural residues (like silica from rice hulls).

The proportion and addition fraction of these feed modifiers varies over a wide range and is based on the final application of the carbonaceous material product, process constraints for the environment and cost effectiveness. After proper selection and proportion formation, feed modifiers are added and blended to the partially pyrolyzed enhanced and homogenized carbon base, at either ambient conditions or elevated temperature ranges. The selection, proportional mix, thermal breakdown and liberation is the next key aspect of the present invention in the manufacture of carbonaceous materials.

The proportional distribution of feed modifier additive mix serves several contributions to the formation of and manufacture of carbonaceous materials, among them are:

It provides for green binding of the enhanced and homogenized carbon base feed.

It provides for the facilitation of particle contact between the dispersed enhanced low rank carbon base materials.

It provides for the chemical bonding and linkage between the two separated discreet reactive carbon base feed particles.

It provides for the carbon deposits as a reactive filler to the successive micropores formed due to the thermal breakdown of carbon base feed at elevated temperatures.

It provides for sequential release of the hydrocarbons over the spread of temperature distribution during the adhesion and nucleation steps discussed later.

It provides for decreased internal pressure build up during the devolatilization of nucleating agent additive.

It provides continued adhesion as a function of increasing temperature by undergoing selective thermal breakdown.

Figure 11:
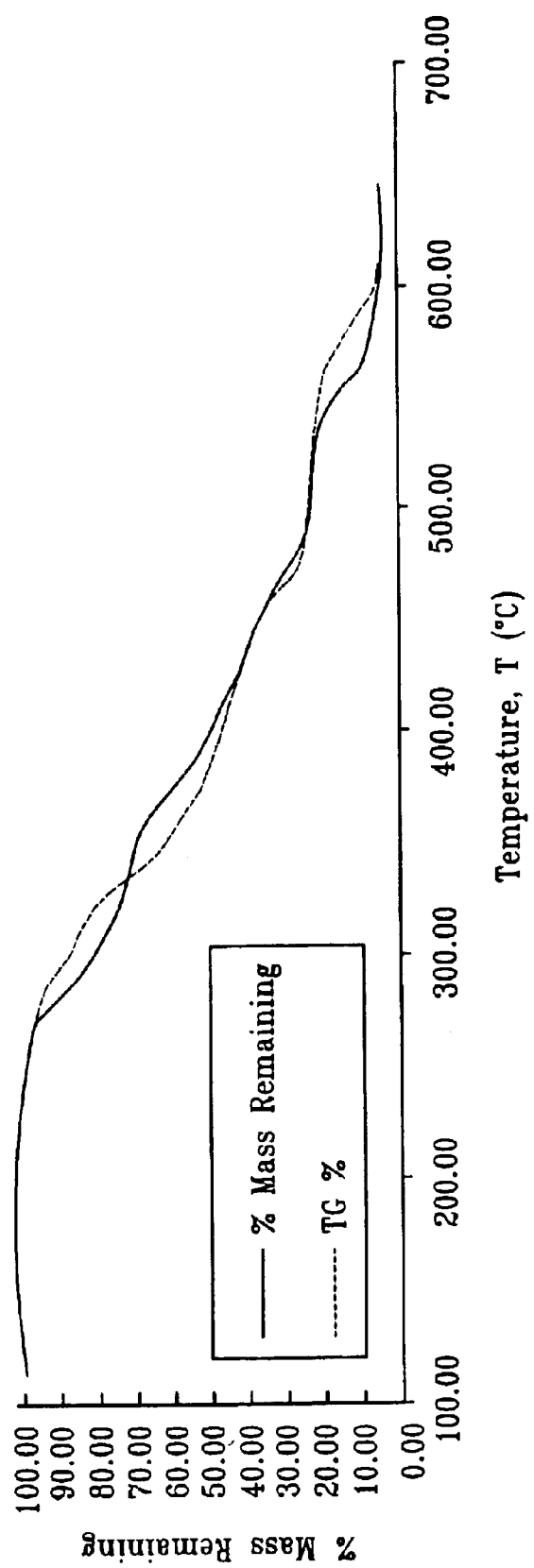
FIG. 11 shows a typical thermal breakdown curve for a mixture of feed modifier.
Figure 12:
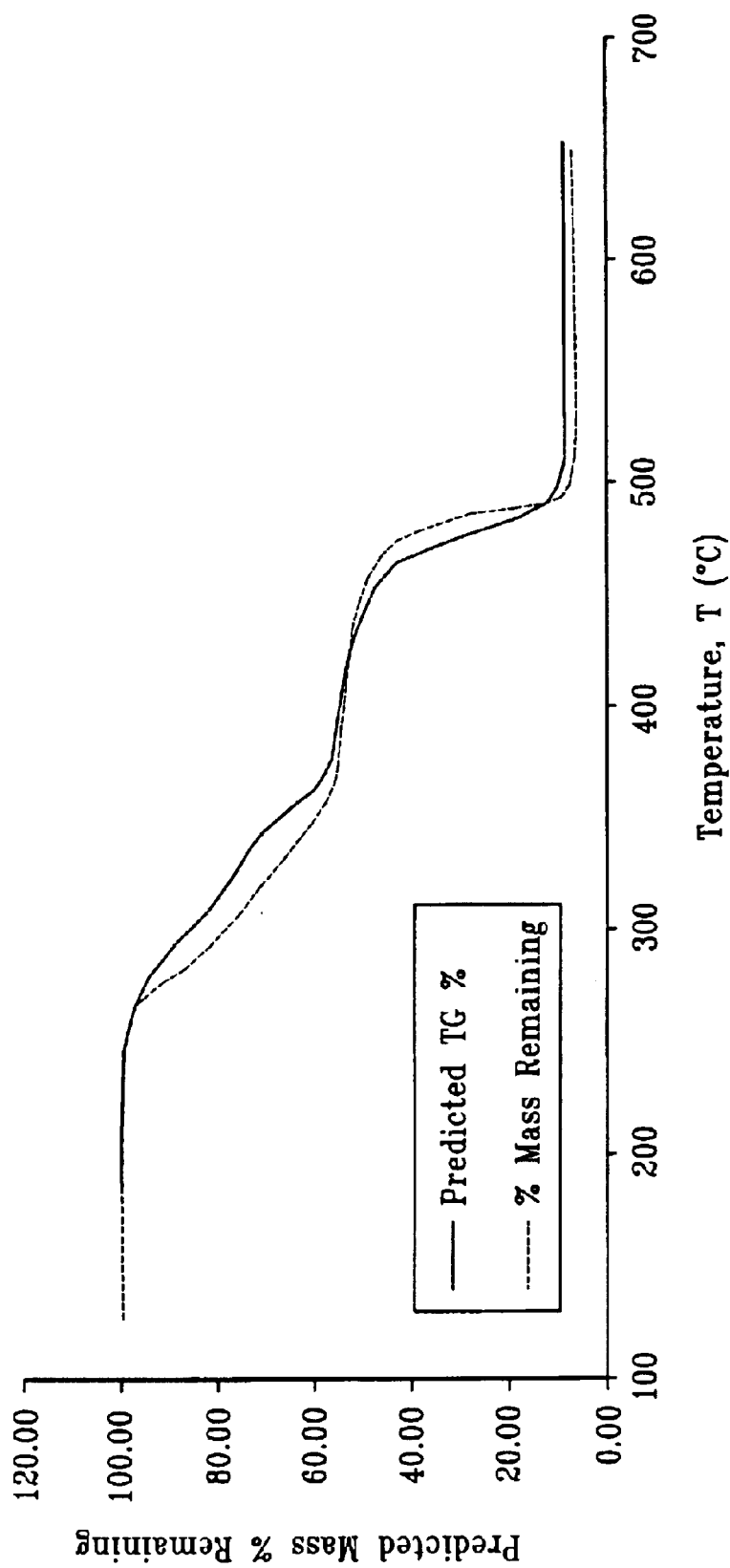
FIG. 12 shows another example of thermal breakdown curve with carbon addition.

A typical thermal breakdown curve for a proportional mix of modifier is given as FIG. 11. This curve is the representation of the mix of additives like PTFE (polytetrafluoroethylene), PE (polyethylene), Vinyl acetate, and PMMA. The predicted curve rate is used to predetermine the proportional mix needed of the specific alloy, while the solid curve is the ability of the mix to decompose at the predicted rate. The presence of vinyl based compound in this typical mix allows for the carbon deposit formation (FIG.

12) at elevated temperatures. This formation of carbon deposit at elevated temperatures provides adhesion for the particles of low rank carbon feed base.

Figure 13:
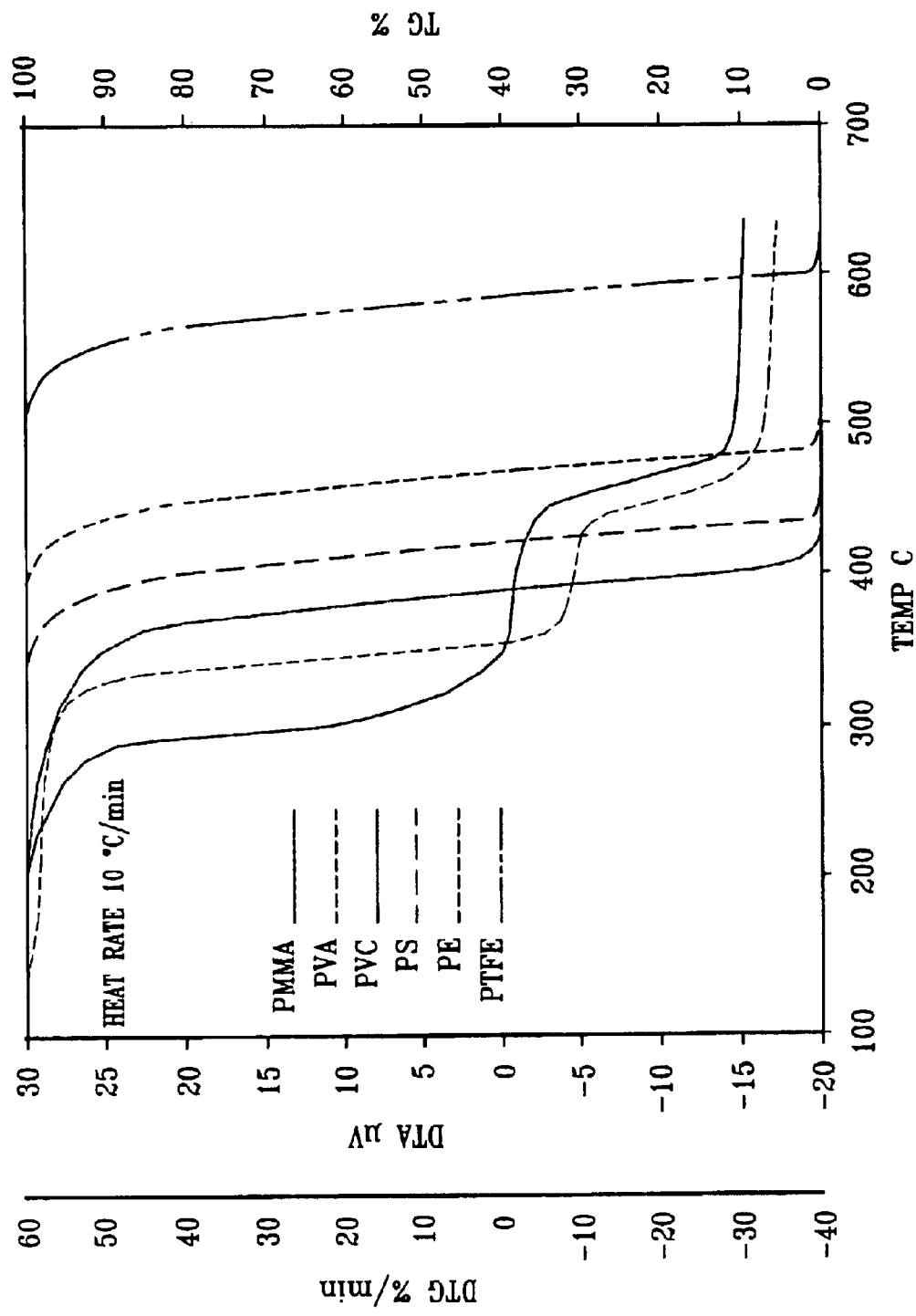
FIG. 13 shows an example of thermal decomposition and kinetic behavior of some polymeric feed modifiers for use according to one aspect of the invention.

The proportional mix of additives is developed based on the individual thermal breakdown of each additive component (FIG. 13) and its use in the property enhancement of the final carbonaceous material product.

Mold Formation

The proportional mix of additives along with the carbon base feed is molded at ambient or elevated temperatures (up to 300° C.) into various shapes and sizes, as depicted at 44 of FIG. 1, depending on the application of the alloy. At this stage, in the case of inorganic-doped carbonaceous material, the doping base is added in desired proportion.

Molds and structures of suitable shape are formed from the blend of feed modifiers and partially pyrolyzed enhanced and homogenized carbon base. The mold formation process must be carried out at ambient or elevated temperatures, using pressure, torque, and shape that will yield satisfactory shapes. Highly dense shapes with large feed modifier contents may rupture during the final heating process. On the other hand, shapes formed under low pressure may include void spaces which are hard to fill or coalesce with feed modifier or carbon deposits.

The pressure range varies from 5000 psig to 20,000 psig. The lower end pressures are applied to carbonaceous material mix with high volatile content base and with the thermal breakdown pattern that has narrow temperature window, i.e. in the temperature differential range of 200–300° C. or less. The higher end pressures are applied to carbonaceous material mix with relatively low volatile content base and the thermal breakdown temperature window is spread over wide temperature range, i.e. in the temperature differential range of 250–800° C.

The shapes of the molds are dependent upon the packing factor requirement of the end use carbonaceous material, examples are schematically represented at 46 of FIG. 1. In the case of carbonaceous material molds being used for foundry application, an elongated pillow shape is preferential to allow for increased time retention for gases. In the case where the alloy is to be used for blast furnace application, a star shape, pillow shape or the Raschig ring shape is preferential. This is to allow for efficient gas permeability across the bed and it also allows for reduced reactivity of the carbonaceous material. In the case of high temperature combustion process fuel, a donut or beehive shape is preferred to allow for increased surface area availability. Some shapes like cubes or rectangular cylinders are not preferred as they do not allow for sufficient gas permeability and reactive surface contact. These shapes are good for side structural support in the furnace.

In general, the molds have shapes that allow a certain fraction of void volume, on packing of the furnace, cupola, rotary kiln, stack, etc.; and that withstand the loading pressure. The size of the molds is governed by their final application.

Curing, Adhesion, and Nucleation

Curing, as at 50, adhesion and fractionation, as at 52, of the mold mix and void collapse of the carbon base, as at 54 of FIG. 1, are also part of the process. The curing stage 50, is carried out for the molds in a stationary or moving grate-like devices or cassette-like devices, where hot inert gases (such as flue gases) may gently flow through the mold mixes. The mold mixes are to be handled gently: their transfer from one unit operation to the next should not exceed a free fall of 6 ft. The curing stage is normally conducted in a temperature range of 150–500° C., with heating rate variations from 1° C./min to 100° C./min, depending on the size of the mold and the type and proportions of feed modifiers present in the mix for the formation of the carbonaceous material.

At the end of curing step, the mold mix is subjected to adhesion step and the nucleation step, for formation of the carbonaceous material. These steps are conducted normally in a temperature range of 300–700° C., in a controlled heating process. The selection of heating rate at this stage is one of the most critical parameters. Improper selection of heating rate at this stage may result in the formation of undesirable fractures within the alloy. The heating rate can vary from 1° C./min to 100° C./min, depending on the major dimension of the mold mix (heating rate is inversely proportional to the major dimension), the mechanism of heat transfer, the size of the mold, the application of the carbonaceous material, and environmental constraints.

Reduction of Pollutant Formation

The change in heating rate may advantageously be adjustable in such a way, that the formation of toxic substances such as BTX and related components; and NOx and SOx the precursors to acid rain forming gases are minimized or eliminated, as schematically depicted at 56 of FIG. 1. The process temperature distribution has been designed in such a way that its permitting would not contravene the existing Clean Air Act. This aspect of adjustable heating rate to minimize the emissions of greenhouse gases and criteria pollutants is a potentially valuable aspect of an alternative embodiment of the present invention.

Conduction Vs. Convective Heating

The heating at the curing, chemical linking or adhesion, and void collapse stages can be conducted by natural or forced convection process, as depicted at 58 in FIG. 1. It has been found that convection heating can have several advantages over conduction heating for the production of carbonaceous materials:

Convection heating provides for uniform distribution of surface temperature and minimizes any thermal gradient. This reduces the tendency to form structural deformations in the alloys.

Convection heating helps in significant reduction of time taken for the internal heating of the carbonaceous material.

Convection heating allows for the minimization of temperature gradient between the internal temperature of the alloy and the outer surface temperature of the alloy. This helps in the reduction of the Biot number ($N_{Bi}$). $N_{Bi}$=hD/K which is the ratio of external heat transfer (h) to the internal heat transfer (K) in a solid of diameter (D). Convection heating allows for the minimization of thermal stress formation within the solid carbonaceous material mold.

Due to uniform distribution of temperature within the carbonaceous material, convection heating allows for homogeneous liberation of feed modifiers across the solid carbonaceous material molds.

The application of convection heating provides its challenges due to the reactive nature of the carrier gases. This needs careful designing of the reactor vessel.

The vessel for this process is designed to be a stationary or moving grate, tube, tunnel, rotary or cassette or a variation thereof. Heating is by direct or indirect mechanisms. The atmosphere within the unit is maintained at oxygen content less than 5 mole-% (in the gaseous phase). In the case of direct heating, an additional step provides a gas curtain between the mold mix and the bulk gas phase, by applying forced draft convection and fluid flow mechanisms. This minimizes or eliminates damage to the mold mix surface and to the internal void structure of the carbonaceous material.

Evolved gases are led to in situ oxidation or are drafted out to the recirculated controlled oxidation chamber, where (in the presence of catalysts) these gases are nearly completely destroyed at low temperatures, minimizing the formation of acid rain gases. The oxidized gases are recycled to heat the new raw product stream or used for co-generation of energy.

Void Collapse

At the end of adhesion and nucleation steps, the mold mixes are diverted to a high temperature step, to collapse voids in the alloy structure and minimize hydrocarbon content. The void collapse step 54 can facilitate patching any of the ruptures that may have occurred in the alloy as a result of high temperature treatments and resultant changes in the morphology of the carbon base feed. This step is carried out in the temperature range of 700° C. to 1300° C.

The heating process can be carried out by forced convection by direct or indirect mechanisms. The heating process is enacted at controlled heating rates varying from 1° C./min to 30° C./min, depending on the size and final application of the carbonaceous material. The heating of the alloy at this stage is governed primarily by a radiation process, followed by a convection process. Efforts are made to minimize the contribution by conduction mode, thereby increasing overall efficiency. Combining radiation and convection heating processes differs from the conventional conduction method of heating in coke production and carbon electrode production. Using radiation and convection heating processes, in part, reduces the heating time during this step to 2–4 hours, a significant reduction from the 20 hours or more typically used in conventional coke production or carbon electrode production.

A convection heating apparatus can be made in different forms and shapes with essentials being grate mesh bed to support the solids, the availability of gas movement to facilitate contact between gas and solid carbonaceous material, an indirect or heating medium and a controlled gas atmosphere to prevent the damage to the chemical and physical integrity of the carbonaceous material product.

The convection heating step is facilitated by the presence of some porosity in the charge of carbonaceous material that is loaded into the heating apparatus. This porosity may be achieved by providing the carbonaceous material charged to the heating apparatus in the form of a collection of individual molds of a predetermined uniform size and shape. The molds are shaped and sized, such that when a large number of them are placed into a mass to be charged, their mass has porosity in the range of 0.1 to 0.5 to allow heated air to be circulated in a satisfactory manner around each of the individual molds. In that way, they may be heated more quickly relative to a process relying on conduction heating only, and the overall process time is greatly reduced.

The porosity in the bed can be maintained in such a way that the atmosphere within this unit is controlled in terms of oxygen, water, carbon dioxide, carbon monoxide and hydrogen content in the boundary and bulk gas phase. This might be schematically depicted as direct heating by boundary layer gas separation under controlled atmosphere, as depicted at 60 of FIG. 1. The oxygen content in the boundary can be a maximum of 5%: CO2 at 10%, water 10%, CO 15%, and H2 15%. In the bulk phase, the CO2 and water content needs to be higher than 10% to drive the minimization of CO and H2 formation. The specific mix of the gas in this unit depends on the alloy application and the final treatment temperature of the alloy. The temperature gradient within the alloy mold may be beneficially restricted to a range of 200–400° C. across the molded product, depending on the size and application of the alloy. A stream of reject solid carbon base is introduced at the top of the mold mix in this unit. This reject solid carbon base is used as a sacrificial agent to protect the pitting and damage of the carbonaceous material product under this high temperature reactive condition. The charge of solid carbon reject helps in increasing the strength of the alloy, minimize the reactivity and prohibits the formation of structural defects in the carbonaceous material molds.

The evolved gases are subjected to complete in situ destruction in the unit, or are drafted to a recirculated oxidation chamber for controlled destruction. The combusted gases are then recycled to an integrated gas clean-up system and co-generation unit, to produce energy and minimize greenhouse and hazardous gases. The integrated co-generation unit allows for installation in remote areas, leading to improved economics of the process.

Controlled Cooling of Alloy

The carbonaceous materials are subjected to the controlled cooling step, as depicted at 62 in FIG. 1. Controlled cooling can avoid ill effects of abrupt exposure to low temperatures that can develop fractures and defects within the alloy. The cooling step is conducted in an inert atmosphere and by the process of forced convection. The temperature gradient is maintained in the 100–500° C. range, with a surface temperature up to 300° C., depending on the size and application of the desired alloy. Final cool down is achieved through water cooling or natural convection.

The following is one example for the preparation of a carbonaceous material that complements the above description. This particular example is directed to producing a carbonaceous material that is useful as a coke substitute. The generalized process and variations and combinations of them can be used for producing the desired characteristic of other desired carbonaceous materials as described above.

Step 1 Understanding Thermal Behavior and the Pyrolysis Kinetics of Low Rank Carbon Feed Source.

Figure 2:
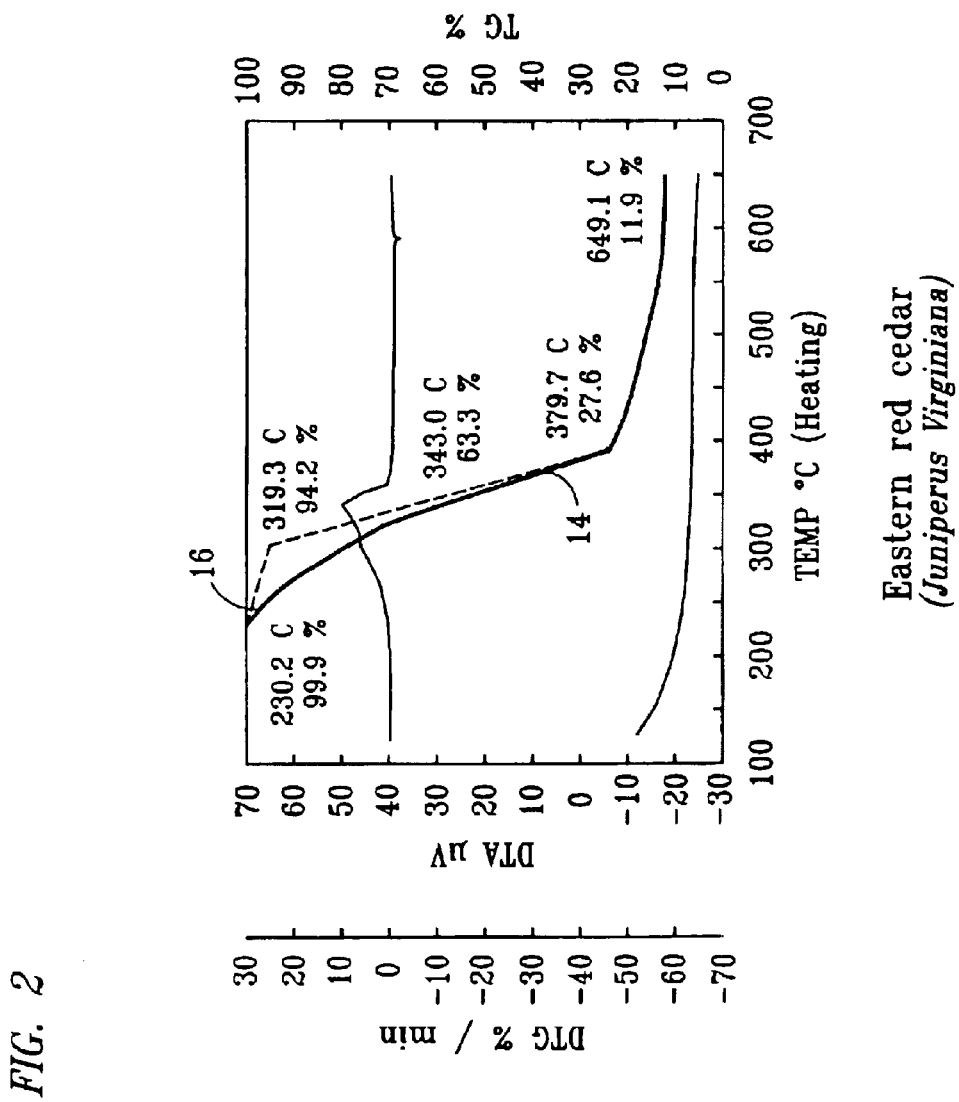
FIG. 2 shows an example of partial pyrolysis kinetics for Eastern red cedar as one usable source of carbonaceous feed material selectable for its characteristics according to one aspect of the invention.
Figure 4:
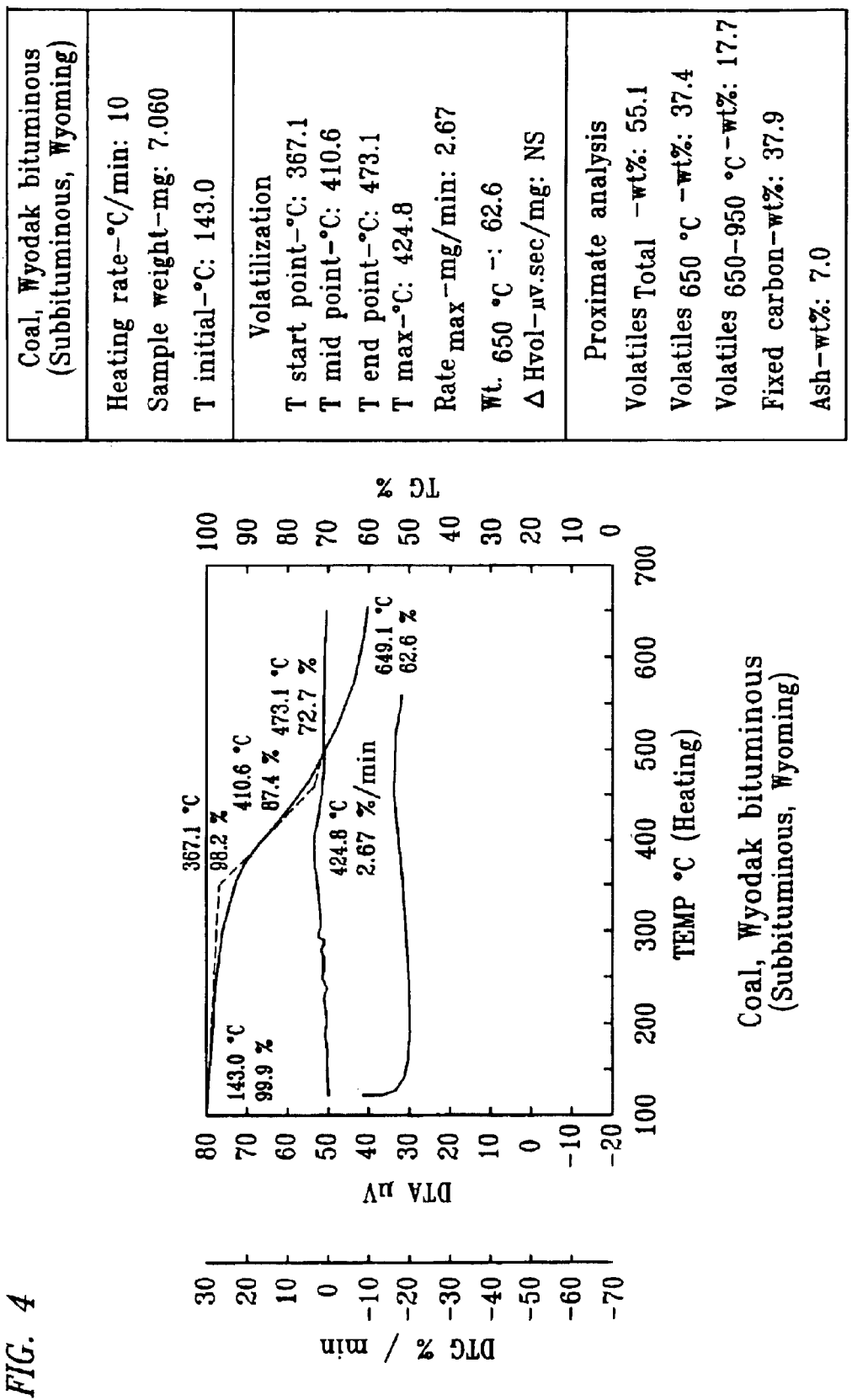
FIG. 4 shows an example thermogram for Sub bituminous coal as another usable source of carbonaceous feed material selectable for its characteristics according to one aspect of the invention.
Figure 5:
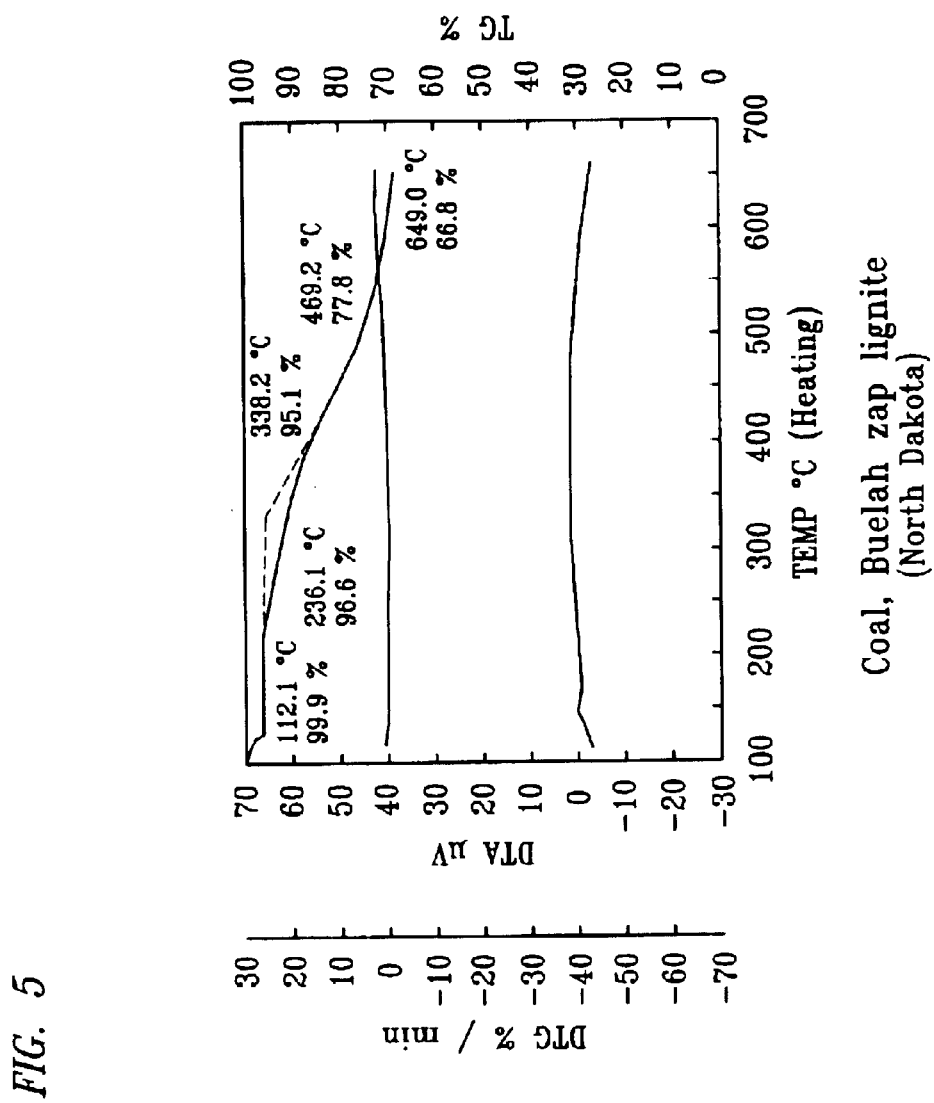
FIG. 5 shows an example thermogram for Lignite as another usable source of carbonaceous feed material selectable for its characteristics according to one aspect of the invention.
Figure 6:
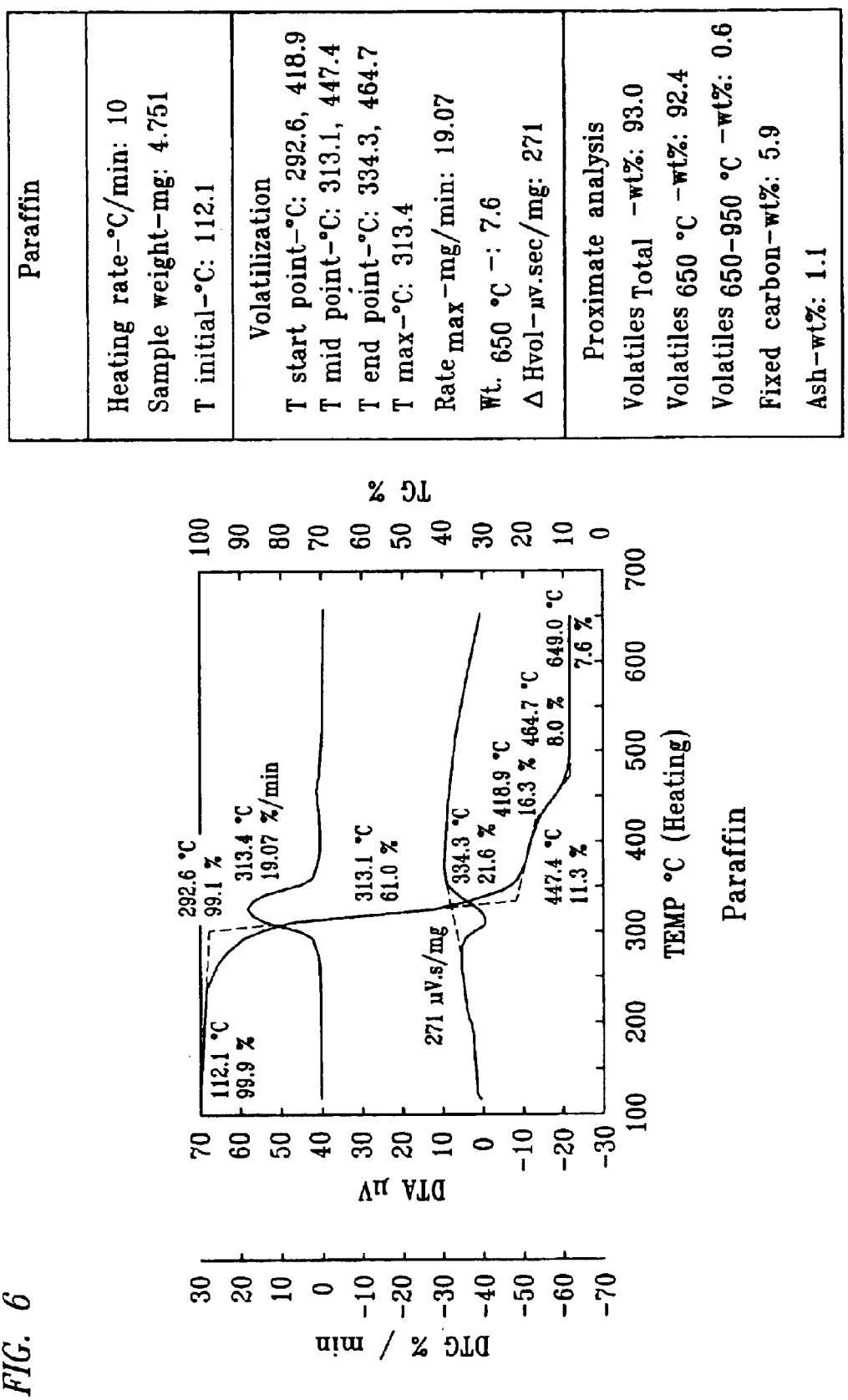
FIG. 6 shows an example thermogram for paraffin as another usable source of carbonaceous feed material selectable for its characteristics according to one aspect of the invention.
Figure 7:
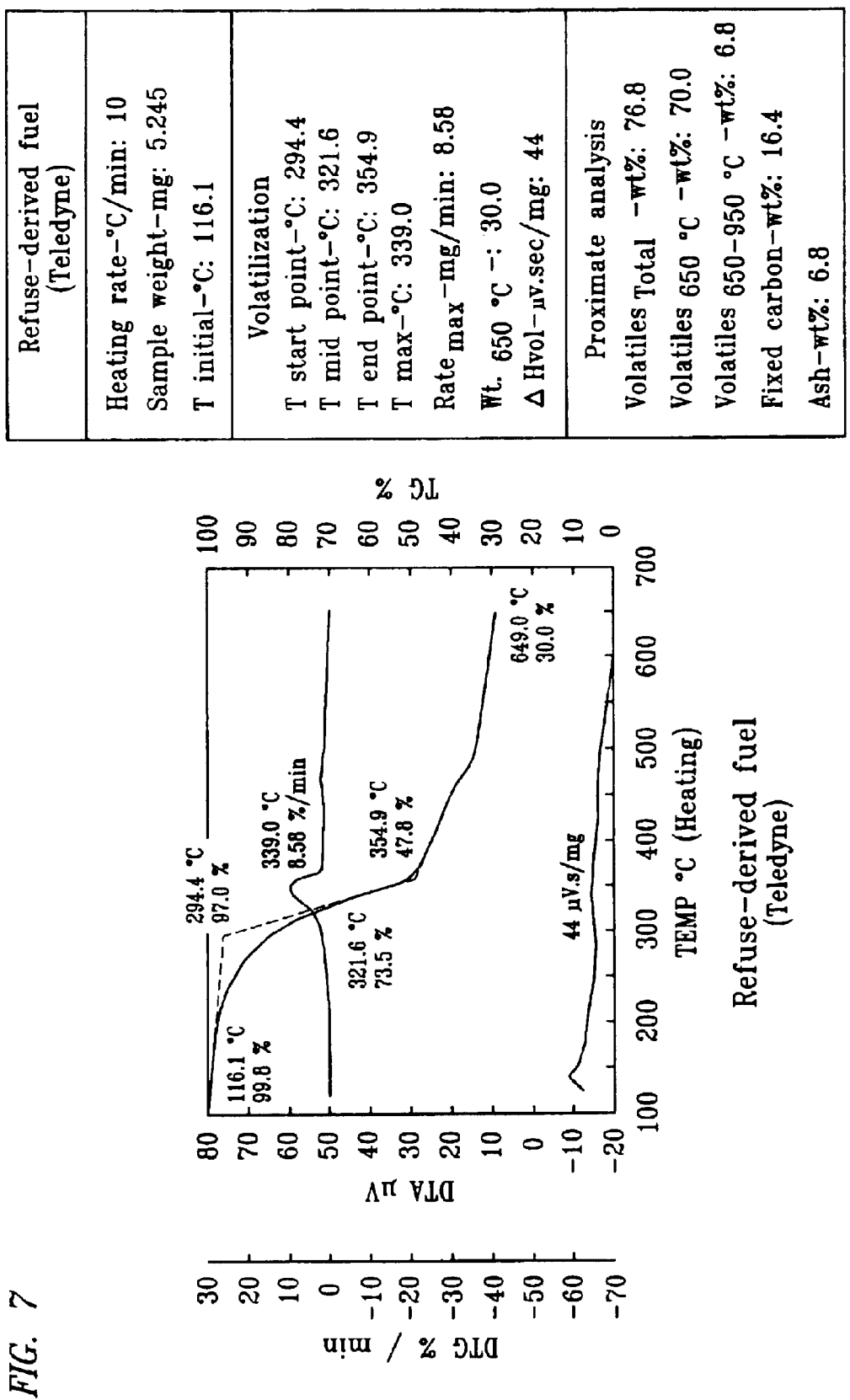
FIG. 7 shows an example thermogram for refuse derived fuel as another usable source of carbonaceous feed material selectable for its characteristics according to one aspect of the invention.

FIGS. 2 and 4 show the thermolysis curves for two low rank carbon based feed materials, Eastern red cedar, a forestry biomass and Wyodak subbituminous coal from Wyoming. Both of these materials are of low rank and have significantly reduced structural strength in comparison to standard metallurgical grade coal used in conventional processes for making coke. Based on the thermogram given in FIG. 2 the thermal breakdown of eastern red cedar begins at 230° C. with a rapid rate of volatile evolution at approximately 367° C. This rapid evolution of volatile gases leads to the formation of active surface sites in the carbon structure useful for nucleation site for particle growth. FIG. 4 shows the thermolysis of subbituminous coal from Wyoming having the devolatilization process initiating at around 367° C., with the rapid rate of evolution reaching its maximum at around 424° C. The initiation of the thermal breakdown of subbituminous coal at 367° C. and the formation of active nucleating sites in eastern red cedar at approximately the same temperature (367° C.) allows for the intrinsic interaction between the two low rank carbon sources to form an agglomeration of these two very different carbon sources into one matrix.

Hence, the selection of these two materials as the source feed for the preparation of carbonaceous material is beneficial to the process. In the current example, the percent mix of these two sources will be 65 wt % subbituminous coal and 35 wt % eastern red cedar.

Step 2 Ash Reduction and Modification

The ash content of the source carbon feed would need to be reduced to meet the specifications for the coke substitute to be used in steel industry. The requirement of ash in coke for use in steel industry is in the range of 8–12 wt %. Since the ash content of the carbon feed source in the current example is 1.5 wt % and 7 wt %, respectively, these carbon sources would not require any ash reduction techniques for their application as coke substitute.

Step 3 Alteration of Reactivity

The reactivity of low rank subbituminous coal from Wyoming increases with the liberation of volatile content at enhanced rate (35 wt %/min) of volatile liberation due to the formation of micropores. This increase in reactivity provides sites for suitable carbon deposits in the strength and fluidity enhancement step.

Step 4 Enhancement of Strength and Fluidity

Subbituminous low rank Wyoming coal (65 wt %) and Eastern red cedar (35 wt %) is mixed with polyvinyl acetate (5 wt %), coke breeze (5 wt %), and coal tar (7 wt %) at this stage to provide for enhanced fluidity and strength to the carbonaceous material feed. This mixture of feed is thermolated in the temperature range of 250° C. to 650° C. at a heating rate of approximately 100° C./min under no to minimal (less than 7 wt %) oxidant conditions. The resultant product or the enhanced feed has increased strength and fluidity and demonstrates particle agglomeration.

Step 5 Addition of Inorganics and Homogenization

After the formation of agglomerated particles from the above mix of feed materials about 2% by weight silica is added to the enhanced feed to help provide the structural integrity to the enhanced carbon feed material.

Step 6 Addition of Feed Modifiers

Feed modifiers are added to the enhanced carbon feed to help modify the properties of the carbonaceous material to suit the end use. In the case of carbonaceous material as a substitute for coke, the desirable properties are reduced reactivity, enhanced structural strength, stable product and resistance to abrasion. In order to achieve these properties from the enhanced feed from low rank carbon base materials the following mixture of additives is developed: Enhanced carbon feed 65 wt %; High volatile coal 8 wt %; Tire 4 wt %; Polyvinyl acetate 3 wt %; PTFE 2.5 wt %; Polymethyl methacrylate 3 wt %; Coal tar 7 wt %; and Coke breeze 7.5 wt %.

Step 7 Mold Formation

After the blending and mixing of suitable feed modifiers, molds are formed of suitable size and shape that will permit gas flow in the furnace and would provide necessary surface area for requisite reactions to take place. Some of the suitable mold shapes for use in steel making are star; pillow; donut; elongated cylinder; and Raschig ring. The most appropriate shape is star and donut shape as they allow for appropriate gas flow and provide necessary surface area for the reactions to occur.

Molds are formed from the mix of materials discussed in step 6 and subjected to compaction at pressures in the range of 4000–8000 psig in the size of 3.5 inch×2.5 inch×2 inch.

Step 8 Curing, Adhesion and Nucleation

The curing step for molds is carried out in a convective grate up to temperature range of 400° C. at a heating rate of 50° C./min.

The adhesion step is carried out in controlled gas atmosphere, i.e. oxygen less than 7% at a heating rate of 30° C./min up to temperature of about 600° C. This is followed by nucleation step carried out under controlled gas atmosphere, i.e. oxygen less than 5%, CO2 less than 15%, H2O less than 15% up to temperatures of 950° C. at a heating rate of 20° C./min. The adhesion and nucleation steps are carried out in convective mode with controlled Biot numbers to minimize defect formation due to the formation of thermal stresses in the molds.

Step 9 Void Collapse

This step of the process is carried out under controlled atmosphere of oxygen less than 4%, CO 2 less than 10%, and H2O less than 10% at the boundary layer formation. The heating at this stage is done by radiative and conductive methods followed by a convective layer. The placement of sacrificial carbon base provides for the minimization of surface defects. The heating of the mold at this stage is conducted at a rate of 5–15° C./min.

Step 10 Controlled Cooling of the Alloy

The carbonaceous material as coke substitute is cooled under controlled conditions so as to maintain the temperature difference within the mold at less than 500° C. The cooling is conducted by the flow of cooled flue gases under forced convection environment. The convective cooling is responsible to reduce the formation of defects in the alloy during the cool down cycle and minimizes the formation of thermal stresses.

Among the embodiments of the invention contemplated by the inventors, the following embodiments and subcombination may be understood based upon the foregoing description, the drawings and the claims.

A carbonaceous material is formed comprising a particulate of partially pyrolyzed carbon (PPC) base formed on heating a carbon-containing material; and a nucleating agent in the form of a interactive filler, the nucleating agent adhering together to the PPC particles on application of heat to the carbonaceous material. The carbonaceous material thus provided may be formed wherein the carbon-containing base material is selected from the group consisting of refuse coals, coal tailings, agricultural wastes, polymeric wastes, lignite, non-coking coals, non-caking coal fines, caking coals, degraded polymers, refuse carbonaceous materials like tires, municipal solid waste. The carbonaceous material may be one wherein the carbon-containing base material has an ash content not exceeding about 40% by weight. The ash content of carbonaceous material with an ash content not exceeding 40% by weight, may be further reduced by washing. The carbonaceous material may be beneficially formed using a carbon-containing material that has an ash content not exceeding 10% by weight. The ash content of the carbonaceous material may be further reduced by washing. The PPC may be formed by thermal conversion in a thermolytic environment or in a pyrolytic environment. Such thermal conversion may occur in a temperature range of between about 250–800° C. at a heating rate of about 1° C./min–1000° C./min for certain selected carbon containing material from which the PPC is formed.

The carbonaceous material that is to be formed may further be the result of molding the nucleating agent and the PPC into selected shapes. The possible shape or shapes may be selected for purposes of a specific subsequent use of the carbonaceous material. The carbonaceous material may for example be molded into a shape having approximate dimensions for length in the range of about 1–9 inches, width in the range of about 1–9 inches and height in the range of about 0.25–6 inches. The carbonaceous material produced may include between about 5–50% by weight of selected feed modifiers. The feed modifiers may for example be selected from a group consisting of synthetic and natural hydrocarbons, including for example virgin polymers, vinyl acetates, methacrylates, ethylenes, polymeric resins, recycled automobile wastes, recycled polymeric wastes, agricultural wastes, agricultural oils and fats, molasses, biomass tar fluids and pitches, coal tar and pitches, activated carbon bases, carbon residue from industrial wastes, and inorganic fractions from agricultural residues like silica from rice hulls. This list is by way of examples that applicants find may have certain advantages. Other examples with similar compatible characteristics may be used depending upon the modifications to the feed that may be intended for producing a desired carbonaceous material or carbonaceous material.

A process for production of a carbonaceous material is contemplated for example may include providing a particulate carbon-containing material for producing a defined specific partially pyrolyzed carbon (PPC) in a thermolytic or in a pyrolytic environment. A selected carbon-containing base feed material is thus heated according to the thermogram indicated characteristics and may be mixed with a feed modifier. At least one shape is formed from the mix of PPC and feed modifier. The shape is cured and adhesion and nucleation of the shape is accomplished under controlled pressure and heating fractionation of the feed modifier within the shape is accomplished. Voids are collapsed within the shape of carbonaceous material. The carbonaceous material shape is returned to ambient temperature and pressure by cooling heat transfer. A nucleating agent may be added during the process. An adhesion agent may be added during the process. Both nucleating and adhesion agents may be mixed into the carbon-containing material.

In one embodiment of the invention, the carbon-containing material may be selected from a group of carbon-containing materials comprising refuse coals, coal tailings, agricultural wastes, polymeric wastes, lignite, non-coking coals, non-caking coal fines, caking coals, degraded polymers, and refuse carbonaceous materials such as tires and municipal solid waste.

Carbon-containing material having an ash content not exceeding about 40% by weight can be used. The process may also include reducing ash from carbon-containing material prior to producing a PPC. The carbon-containing material may have a reduced ash content not exceeding 10% by weight. The ash content may be achieve by washing.

The act of producing a PPC may include thermolysis of the carbon-containing material between about 250–800° C. at a heating rate in a range of about 1–1000° C./min.

The act of producing a PPC might alternatively include pyrolysis of the carbon-containing material between about 250–800° C. at a heating rate in a range of about 1–1000° C./min.

A feed modifier may be used to hold at least one shape together in a green state.

The curing from the green state can be accomplished at temperatures below about 300° C.

The at least one shape may have dimensions in the range of length between about 1–9 inches, width between about 1–9 inches and height between about 0.25–6.00 inches.

The feed modifier may act as a nucleating agent.

The fractionation and separation of components from feed modifiers may be promoted.

The feed modifiers may be mixed with the PPC in a selected amount of from between about 3–50% by weight.

The feed modifiers may be selected from a group consisting of synthetic and natural hydrocarbons. Examples of such feed modifiers include virgin polymers, vinyl acetates, methacrylates, ethylenes, polymeric resins, recycled automobile wastes, recycled polymeric wastes, agricultural wastes, agricultural oils and fats, molasses, biomass tar fluids and pitches, coal tar and pitches, activated carbon bases, carbon residue from industrial wastes, and inorganic fractions from agricultural residues such as silica from rice hulls. The feed modifiers may be selected to provide a framework for maintaining nucleation and adhesion of particles of the PPC during initiation, manufacturing and completion of the process.

Maintaining nucleation and adhesion may be facilitated by using a process temperature range of between about 200–800° C. at a heating rate of between about 1–200° C./min. A further example of maintaining nucleation and adhesion during the process includes using a controlled atmosphere of oxygen less than about 5%, CO2 more than about 10%, and water more than about 10% in the bulk gas phase.

The carbonaceous material may be molded into a desired shape or into various shapes using a compaction mold of the desired shape. The mold pressure may be between about 4000 and 8000 pounds per square inch.

Void collapse within the molded shape of the carbonaceous material may be facilitated by subjecting the carbonaceous material to temperatures in the range of about 700–1300° C. Further facilitation of void collapse may be accomplished at a heating rate in a range of between about 0.5–60° C./min. Use of a controlled atmosphere of oxygen less than 5%, CO2 less than 10% and water less than 10% near the gas-solid interface may further facilitate void collapse. The void collapse process may take place in a controlled atmosphere of less than about 5% oxygen, more than about 10% CO2, and more than about 10% water in the bulk gas phase. The temperature gradient for void collapsing may be between about 200–400° C. across the molded shape.

Evolved gases may be subjected to in situ oxidation or such evolved gasses may be drafted to controlled oxidation chamber. The gases from the process may be utilized for gas clean up train for co-generation.

The act of void collapse may be carried out under natural or forced convection modes.

The act of controlled cooling of molds may be carried out by a convective heat transfer process.

An alternative process for the production of carbonaceous materials, includes providing a feed material comprising either refuse carbonaceous material, virgin carbonaceous material or a combination of both. Inorganic components of the feed material may be reduced from the carbonaceous material. The reduction may be accomplished by heating as in thermolysis or pyrolysis of the refuse, the virgin material or both to form a feed material comprising specialty partially pyrolyzed carbon (PPC). Mixing adhesion and/or nucleating agents in the form of feed modifiers with the PPC provides a framework for maintaining adhesion and nucleation of PPC particles during and completion of the process. Molding the PPC and feed modifier mix may form a variety of selected molded shapes. Subjecting the molds for curing may be accomplished in a convective heating process. Fractionation of feed modifiers may be accomplished in a thermolytic or in a pyrolytic environment. The PPC molded shapes may be pyrolyzed. Void collapse may be accomplished in the molded shapes in a forced convective process or in a natural convective process. Controlled cool down of the mold shapes produces usable shapes of carbonaceous materials.

The refuse or virgin carbonaceous material may be selected from a group consisting of refuse coals, coal tailings, agricultural wastes, polymeric wastes, lignite, non-coking coals, non-caking coal lines, caking coals, degraded polymers, refuse carbonaceous materials like tires, municipal solid waste.

The refuse material may have an ash content not exceeding about 40% by weight.

Reduction of inorganics from the carbonaceous material may be accomplished prior to the thermolysis or pyrolysis of the molded shapes.

The ash content of the carbonaceous material may be limited to not exceeding 10% by weight.

The fractionation of feed modifiers may be accomplished between about 200–800° C. at a heating rate of about 1–200° C./min.

Adhesion and nucleation of PPC may be accomplished between about 200–800° C., at a heating rate of about 1–200° C./min.

The feed modifiers may be selected from a group comprising synthetic and natural hydrocarbons, virgin polymers, vinyl acetates, methacrylates, ethylenes, polymeric resins, recycled automobile wastes, recycled polymeric wastes, agricultural wastes, agricultural oils and fats, molasses, biomass tar fluids and pitches, coal tar and pitches, activated carbon bases, carbon residue from industrial wastes, and inorganic fractions from agricultural residues like silica from rice hulls.

The feed modifiers provide framework for maintaining adhesion and nucleation of particles of the PPC during and on the completion of the act of void collapse.

The act of void collapse may be accomplished in a temperature range of between about 700°–1300° C.

The act of void collapse may be accomplished at a heating rate in a range of about 1–200° C./min.

The act of void collapse may also be accomplished in a convective process.

Although the foregoing description necessarily presented a limited number of embodiments of the Invention, those of ordinary skill in the relevant art will appreciate that various changes in the configurations, details, materials, and arrangement of the elements (herein described and illustrated, in order to explain the nature of the Invention) may be made by those skilled in the art. All such modifications and additional applications remain within the principle and scope of the Invention, as expressed herein in the appended claims.

What is claimed is:

1. A method of making a carbonaceous material for use as a coke substitute comprising:

a) selecting a carbon based feed material and feed enhancers for enhancing nucleation having a combined fixed carbon content greater than 25 wt %;

b) controlling ash content of the base feed material by measurement and adjustment to a desired ash content;

c) heating said carbon based feed material at a temperature in a range of 250° C. to 800° C. to devolatilize constitutants and to form active nucleation sites for carbon;

d) controlling the rate of heating in a range of 1° C./min to 1000° C./min to adjust reactivity of said active nucleation sites;

e) adding a fluidity enhancer selected from the group comprising polymers, tar, pitch and molasses to produce a mixture of fluidity enhanced devolatilized carbon material;

f) adding a strength enhancer selected from the group comprising silica and coke breeze to produce a mixture of strength enhanced devolatilized carbon material;

g) blending said fluidity enhanced devolatilized carbon and said strength enhanced devolatilized carbon into a blended mixture of carbon material;

h) placing said blended mixture of fluidity enhanced and strength enhanced devolatilized carbon material into a compaction mold and compacting at a temperature up to 300° C. and a pressure range of 5000 psi to 20,000 psi;

i) curing the blended mixture of enhanced devolatilized carbon material at a temperature less than 300° C. to produce a carbonaceous material mixture having a molded shape;

j) nucleating and adhering the carbon in the carbonaceous material mixture having the molded shape, by heating at a rate in the range of 1° C./min to 100° C./min up to a temperature in the range of 300° C. to 700° C.;

k) collapsing voids in said carbonaceous material mixture having the molded shape by heating at a rate of about 5° C./min to 200° C./min to a temperature in the range of about 700° C. to 1700° C.; and l) cooling said molded and void collapsed carbonaceous material mixture in flue gases so that the maximum difference of temperature between any two locations within said molded shape of said carbonaceous material mixture is less than 500° C.

* * * * *